United States Patent
Bransky et al.

(10) Patent No.: US 7,283,882 B1
(45) Date of Patent: Oct. 16, 2007

(54) AUTOMATIC RECIPE VALIDATION

(75) Inventors: Itai Bransky, Haifa (IL); Shachor Omer, Nesher (IL); Arkady Simkin, Yokneam Ilit (IL); Igor Baskin, Nesher (IL)

(73) Assignee: KLA-Tencor Technologies Corporation, Milpitas, CA (US)

( * ) Notice: Subject to any disclaimer, the term of this patent is extended or adjusted under 35 U.S.C. 154(b) by 0 days.

(21) Appl. No.: 11/355,598

(22) Filed: Feb. 15, 2006

(51) Int. Cl.
*G06F 19/00* (2006.01)

(52) U.S. Cl. .................................... 700/96
(58) Field of Classification Search ............ 700/26, 700/27, 96, 109, 110, 117, 121; 707/203; 717/170–173
See application file for complete search history.

(56) References Cited

U.S. PATENT DOCUMENTS

| | | | |
|---|---|---|---|
| 5,940,300 A * | 8/1999 | Ozaki | 700/121 |
| 6,035,293 A * | 3/2000 | Lantz et al. | 707/1 |
| 6,165,805 A * | 12/2000 | Steffan et al. | 438/14 |
| 6,415,193 B1 * | 7/2002 | Betawar et al. | 700/97 |
| 6,465,263 B1 * | 10/2002 | Coss et al. | 438/14 |
| 6,735,493 B1 * | 5/2004 | Chou et al. | 700/121 |
| 7,047,101 B1 * | 5/2006 | Young et al. | 700/121 |
| 7,127,320 B1 * | 10/2006 | Brown et al. | 700/121 |
| 2002/0183950 A1* | 12/2002 | Fu et al. | 702/84 |
| 2003/0204281 A1* | 10/2003 | Su et al. | 700/108 |
| 2006/0020362 A1* | 1/2006 | Morinaga et al. | 700/121 |

OTHER PUBLICATIONS

Tseng et al., An effective Recipe Control and Managemet System(RCMS) Deployed in Semiconductor Manufacturing, 2004, IEEE, 135-138.*

* cited by examiner

*Primary Examiner*—Leo Picard
*Assistant Examiner*—Chad Rapp
(74) *Attorney, Agent, or Firm*—Joshua D. Isenberg; JDI Patent

(57) ABSTRACT

Automated comparison of tool recipes is described. A target recipe is digitally translated from a tool language to a standard language format to produce a translated recipe. The translated recipe is digitally compared to a source recipe that is also in the standard language format.

27 Claims, 8 Drawing Sheets

FIG. 4C

Source path: Recipe\RCTestingArcher_53_54_    Target path: Recipe\ForRCTestingArcher_53_54_

Last Modified: 16-May-2005 02:47:57    Last Modified: 16-May-2005 11:47:57

Result: DoesNotMatchInContent

| Parameter Name | Source Value | Target Value | Deviation | -Offset | Offset+ | Compare Result |
|---|---|---|---|---|---|---|
| Name | RCTest10 | RCTest10 | None | 0 | 0 | Pass |
| Element ID | 173 | 58 | None | 173 | 173 | Failed |
| Test #1 | | | | | | |
| Test #1 -> OVL Data | | | | | | |
| Param #1 | 70 | 70 | None | 70 | 70 | Pass |
| Param #2 | 70 | 70 | None | 70 | 70 | Pass |
| Test #1 -> OVL Data -> | | | | | | |
| Param #3 | 0 | 0 | None | 0 | 0 | Pass |
| Param #4 | 0 | 0 | None | 0 | 0 | Pass |
| Param #5 | 1 | 1 | None | 1 | 1 | Pass |
| Param #6 | 1 | 1 | None | 1 | 1 | Pass |
| Param #7 | False | False | None | 0 | 0 | Pass |

FIG. 4D

AUTOMATIC RECIPE VALIDATION

FIELD OF THE INVENTION

This invention generally relates to semiconductor processing and more particularly to recipe comparison and validation in semiconductor processing.

BACKGROUND OF THE INVENTION

Semiconductor manufacturing often uses automated control of fabrication facilities (fabs) having multiple tools that perform different stages of the semiconductor manufacturing process. These tools may include deposition tools, etch tools, chemical mechanical polishing (CMP) tools, inspection tools and metrology tools. The sequence and types of processes performed by each tool is often determined by instructions from a fab automation (FA) controller that is coupled to all of the tools. Commands from the FA determine which process a given tool will perform on a wafer or batch of wafers and the overall sequence of processes performed on a wafer by different tools. Each tool typically executes a process in response to instructions from a computerized controller or agent that is either part of the tool or remotely located and coupled to the tool. The instructions for a given processes is sometimes referred to as a recipe. The recipe is typically characterized by a number of parameters that characterize the process. Where there are a large number of recipes, a fab may include a recipe database manager (RDM) server to store and keep track of these recipes and to allow the user to generate new recipes, e.g., from libraries.

A typical tool allows a user to change the parameters of a recipe manually or to optimize certain parameters automatically during operation. Although this provides flexibility of operation it can also lead to problems. The number of different combinations of parameters for a given recipe can be very large. However, only certain combinations of parameters may be suitable for a given desired process. If certain parameters of a recipe are changed to values outside of an acceptable range, the recipe may not run properly. Unfortunately, on many tools the recipe runs automatically once the recipe is set up and the tool receives a command to run the recipe. The user cannot tell if the recipe was valid until after the recipe runs. Running an incorrect recipe can lead to ruined wafers, reduced yield and lost production time.

It is often difficult to validate a recipe before it is run without access to the parameters. Most recipes are computer coded in a language that can be read by the tool on which it is to be run. Some tool manufacturers can provide a recipe in a text format but manual validation of such recipes is time consuming.

Thus, there is a need in the art, for a method for automatically validating recipes for semiconductor processing tools and an apparatus for implementing such a method.

BRIEF DESCRIPTION OF THE DRAWINGS

Other objects and advantages of the invention will become apparent upon reading the following detailed description and upon reference to the accompanying drawings in which:

FIGS. 4A-4D are a sequence of screen shots depicting recipe comparison according to an embodiment of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
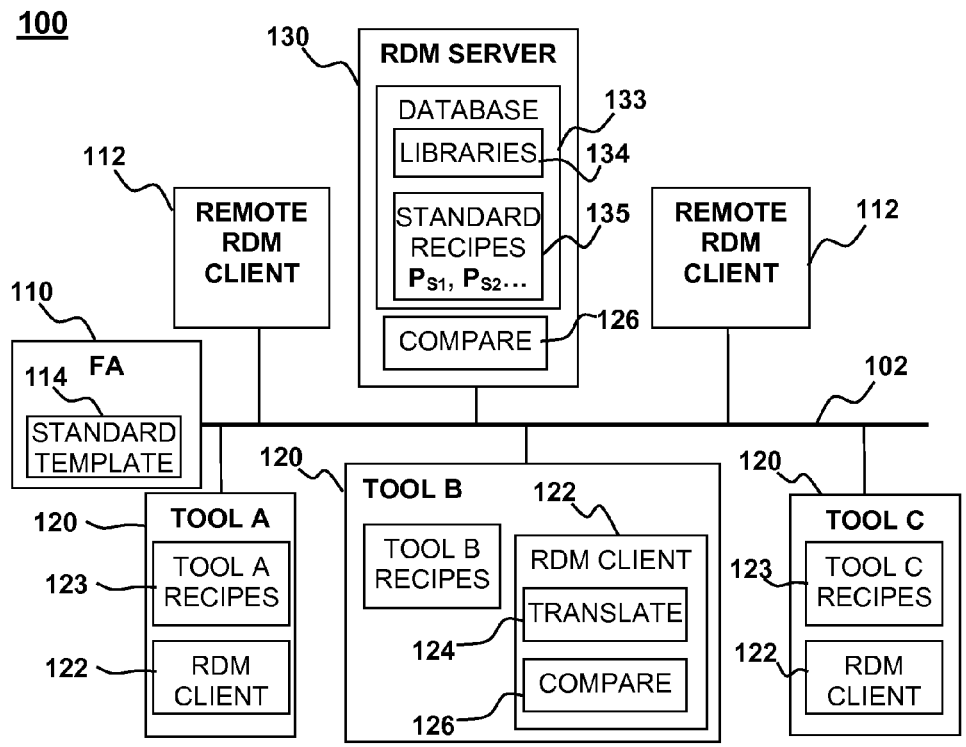
FIG. 1 is a block diagram of a semiconductor processing system implementing an embodiment of the present invention.

FIG. 1 illustrates a semiconductor processing system 100 that implements automated recipe comparison and validation according to an embodiment of the present invention. The system 100 includes one or more semiconductor processing tools 120, a fab automation (FA) 110 (sometimes referred to as a Fab Host) and a remote recipe database management (RDM) server 130. The tools 120, FA 110 and RDM server 130 may communicate with each other through a data bus 102.

By way of example, and without limitation of embodiments of the invention, the tools 120 may include metrology tools, such an overlay tool, a thin film tool, a CD-SEM, a wafer inspection tool, an electron beam tool, or scatterometry tool. Furthermore, the tools may include a deposition tool, etch tool, or chemical mechanical polishing (CMP) tool. In addition, the tools 120 may include lithography tools such as stepper developers.

Figure 2:
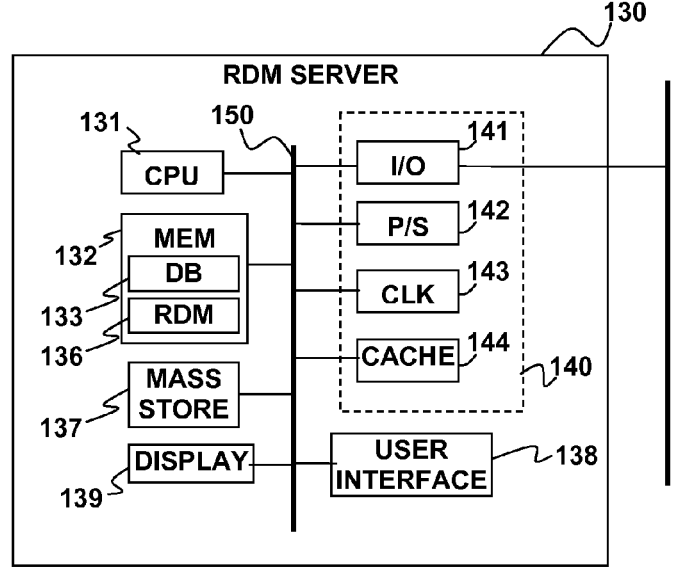
FIG. 2 is a block diagram of a recipe database management server implementing an embodiment of the present invention.

As shown in FIG. 2, the RDM server 130 may include a central processor unit (CPU) 131 and a memory 132 (e.g., RAM, DRAM, ROM, and the like). The memory may contain a database 133 and an RDM software 136. The controller 130 may also include well-known support circuits 140, such as input/output (I/O) circuits 141, power supplies (P/S) 142, a clock (CLK) 143 and cache 144. The RDM server 130 may optionally include a mass storage device 137 such as a disk drive, CD-ROM drive, tape drive, or the like to store programs and/or data. The controller may also optionally include a display unit 139 and user interface unit 138 to facilitate interaction between the controller 130 and a user. The display unit 139 may be in the form of a cathode ray tube (CRT) or flat panel screen that displays text, numerals, or graphical symbols. The user interface 138 may include a keyboard, mouse, joystick, light pen or other device. The preceding components may exchange signals with each other via an internal system bus 150. The RDM server 130 may be a general purpose computer that becomes a special purpose computer when running code that implements embodiments of the present invention as described herein.

The FA 110 acts as a central controller for the system 100. Commands from the FA may be used to build recipes from a database 133 managed by the RDM server 130. The database 133 may further include one or more parameter set libraries 134. Each parameter set library 134 may contain multiple parameters sets. Commands from the FA 110 may combine these parameter sets into recipes to be run on the tools 120. The database 133 further includes a set of standard recipes 135. Each standard recipe 135 includes a set of standard parameters $P_s$. The standard parameters $P_s$ may be determined through a process of optimization of the standard recipes 135. These parameters may depend on the type of tool used in the standard recipe 135. For example, for an overlay type metrology tool, the parameters may include the wafer layout, number of dies, wafer coordinates of a measurement site, eyepoint coordination, exposure times, intensities, optical filter type, and wavelength.

In this example, the database 133 is shown as being stored on the RDM server 130. However, those of skill in the art will recognize that the database 133 may be stored elsewhere in the system 100, e.g., on the FA 110 or on one or more of the tools 120 or on one or more remote RDM clients 112.

In embodiments of the present invention, tool recipes 123 that are to be run on the tools 120 are compared to the standard recipes 135 before running the tool recipes 123. As discussed above, the tool recipes 123 are typically written in a tool language that is particular to the tool 120 on which the tool recipes 123 are to be run. It is noted that different tools may use different tool languages. The standard recipes 135 are preferably prepared or translated into a standard language format. By way of example, the standard language format may be a markup language or any other standard language that can be used for recipe comparison such as text format (e.g., .txt). As used herein a markup language refers to a set of words and symbols for describing the identity of pieces of a document. A markup language combines text and extra information about the text. The extra information, for example about the text's structure or presentation, is expressed using markup, which is intermingled with the primary text. Examples of markup languages include but are not limited to, e.g., ASN.1, EBML, XML, HTML, XHTML, GML, SGML, YAML and the like. Preferably, the markup language is one that is relatively common or standard in the industry and can be hierarchically built. It is also desirable that the markup language allow for embedding of explanatory text and flexibility in changing or creating all elements of a recipe. In a preferred embodiment, the markup language is XML.

To facilitate comparison of the tool recipes 123 to the standard recipes 135, each tool 120 has an RDM client 122 installed in a computer memory that is part of the tool. The RDM client 122 is a software that includes a translation routine 124 that translates the tool recipe 123 from the tool language to the markup language used for the standard recipes 135. In some embodiments, e.g., where different tools 120 use different tool languages, the translation routine 124 may include different translation subroutines that can be used for each separate tool 120. Alternatively, a single translation routine may be used for multiple different tools 120 where the tool, where a group of related tools, have common a manufacturer and/or tool type and/or the tool languages are sufficiently similar.

By way of example, the translation routine 124 may include one or more plug-in subroutines. Each of these subroutines may be implement translation of recipe files in a format specific to a particular tool 120 into the markup language. Development of such translation subroutines is within the capabilities of those skilled in the art.

The RDM server 130 further includes a recipe comparison routine 126, which may be part of the RDM software 136.

Once the tool recipe 123 has been translated into the standard language the comparison routine 126 compares the translated tool recipe to a corresponding standard recipe 135. In alternative embodiments of the invention, the comparison routine 126 may compare two different translated tool recipes, e.g., from different databases on different clients or on different tools. It is noted that in alternative embodiments the RDM software 136 running on the RDM server 130 may include both the translation and comparison routines that function as described herein. Furthermore, in some embodiments, a comparison routine 126 may be resident on a RDM client 122 in addition to or in lieu of the comparison routine on the RDM server 130.

Figure 3:
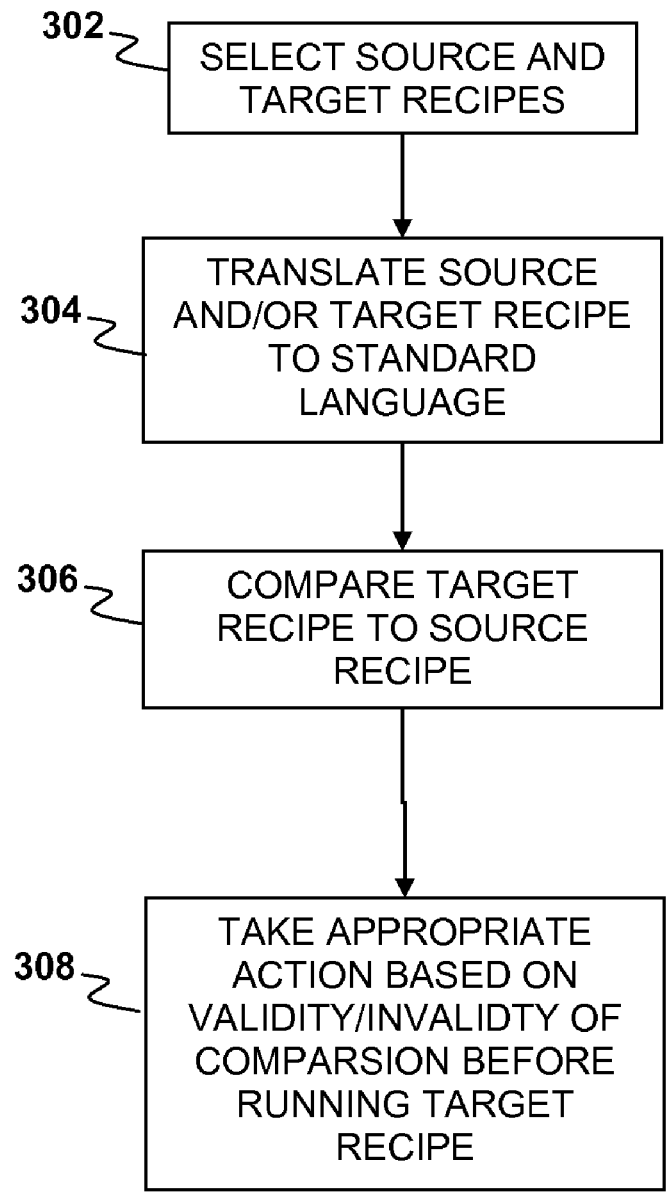
FIG. 3 is a flow diagram illustrating an example of recipe database management according to an embodiment of the present invention.

The RDM client 122 and/or RDM server software 136 may implement a method 300 of recipe validation as shown in FIG. 3. Generally, the method 300 begins at 302 by selecting a source recipe and a target recipe. Selection of the source and target recipes may include selection of source and target devices containing the recipes. By way of example, and without limitation of the invention, the source recipe may be a standard recipe 135 stored in the RDM database 133 on the RDM server 130. Alternatively, the source recipe may be a tool recipe 123 stored on one of the tools 120 or some other recipe, e.g., stored at a remote client 112. Typically, the target recipe is a tool recipe 123, which may be stored on one of the tools, the RDM server 130, a remote client 112 or on some other device coupled to the data bus 102. Alternatively, the target recipe may be a standard recipe 135 stored in the RDM database 133.

At 304 either the source recipe or the target recipe or both may be translated into the markup language so that both the source and target recipes are in the standard language. By way of example, if the target recipe is a tool recipe 123 stored on a tool 120, the translation routine 124 on an RDM client 122 running on the tool 120 may perform the translation.

Once both the source recipe and the target recipe are in the standard language the target recipe may be digitally compared against the source recipe at 306. Such a comparison may be performed by comparing selected lines of the translated target recipe against corresponding lines in the source recipe. There are a number of different ways to digitally compare the target recipe against the source recipe. On possible comparison is to determine whether the source recipe (or a version of the source recipe) exists on the target device. For example, the source and target recipes may be stored as files and identified by filenames. The RDM client 122 may compare a standard recipe 135 against all the tool recipe files stored on a tool 120 to determine whether a version of the standard recipe 135 is present on the tool 120. For example if a recipe is missing from the tool 120 compared to the RDM server database 133, a missing recipe indication may be shown, It is noted that a missing recipe from a tool database is a common cause of process run failure.

Another possible comparison is to compare a relevant time stamp of the target recipe against a corresponding time stamp on the source recipe. For example, a standard recipe 135 may have a time stamp that indicates that it is the most recent version of the standard recipe. This time stamp may be compared against a time stamp on a tool recipe 123 indicating when the tool recently was most recently modified. If the tool recipe has been modified subsequent to the time stamp on the standard recipe 135, the two time stamps will not match. It is noted that in this context, certain tool recipes 123 are automatically optimized for operation on a specific tool 120 when they are run on that tool. It is possible to configure the tool recipe such that such automated optimization does not change the time stamp.

Yet another possible comparison between the source and target recipes is a comparison based on content. In such a comparison, one or more selected parameters of the tool recipe may be checked against corresponding parameters of the source recipe. It is noted that a comparison of all parameters may be unnecessary in some situations. As such, comparisons of irrelevant or non-critical parameters may be skipped. The parameter comparisons may take on different forms depending on the nature of the parameter. For example, certain parameters, e.g., whether a wafer is polished or not, may have a logical value, e.g., true or false. Other parameters may have a numerical value, e.g., a wavelength of radiation used by the tool or duration of exposure or a number of images to be taken of a wafer. The comparison routine 126 may present the result of each parameter comparison as a pass/fail. Parameter comparisons may allow for some range of deviation of a parameter in the target recipe from the corresponding value in the source recipe. For example, a source recipe may call for 20 images to be taken, but the parameter comparison may be configured to allow for a deviation of, e.g., plus or minus two images so that a target parameter value between 18 and 22 will result in a "pass" for a comparison of the number of images called for in the source and target recipes.

It is noted that in embodiments of the present invention the comparison routine 126 may compare a source recipe in the form of a partial recipe standard "template" recipe. Such a template recipe may include a subset of key recipe parameters that are used to validate the tool recipes 123. By way of example, the "template" recipe may include about 10 parameters out of 80 or more possible parameters that can potentially exist. The comparison routine 126 may compare all relevant parameters or only some of them. For example, in some situations it is enough to know that there is a mismatch in any parameter in order to determine that the target recipe fails in a comparison. In such a situation the comparison routine 126 may be configured to stop the comparison and report a failure on the first mismatch.

To facilitate automated recipe comparison, queries, e.g., data files containing sufficient information for the comparison routine to perform the comparison may be generated and stored. The queries may contain such information as whether the comparison is based on existence, time stamp or parameters, the source and target devices and recipes, the relevant parameters (in the case of a parameter-based comparison) to compare, and whether to stop the comparison on the first mismatch (for a parameter-based comparison). Such queries may be run manually upon command from a host, e.g., the FA 110. Alternatively, queries may be run automatically on a schedule or automatically before running a particular tool recipe 123 on a particular tool 120 as a means of validating the tool recipe 123.

After the comparison has taken place, appropriate action may be taken, as indicated at 308 in FIG. 3, based on the outcome of the comparison. There are a number of different possible actions that can be taken. For example, in the case of a simple comparison based on whether the source recipe exists on the target device the comparison routine 126 may perform a parameter- or time-based comparison if a tool recipe matching the source recipe is found on the target device. Alternatively, if a target recipe matching the source recipe is not found, the source recipe may be loaded onto the target device for future use. Furthermore, the comparison routine 124 may alert a user to the failure of the comparison.

For a time-based comparison, appropriate action may take the form of preventing the target recipe from running if the comparison fails and/or performing a parameter-based comparison of the target recipe against the source recipe. If the time-based comparison is successful, appropriate action may include allowing the target recipe to run on the target device. Furthermore, the comparison routine 124 may alert a user to the failure of the comparison.

For a parameter-based comparison, appropriate action may include preventing the target recipe from running on a target device if the comparison fails and/or, if required per user definition, replacing the target recipe or only the mismatched parameters with the source recipe or correct parameters and running the source recipe instead. Alternatively, the comparison routine 124 may alert a user to the failure of the comparison.

Figure 4A:
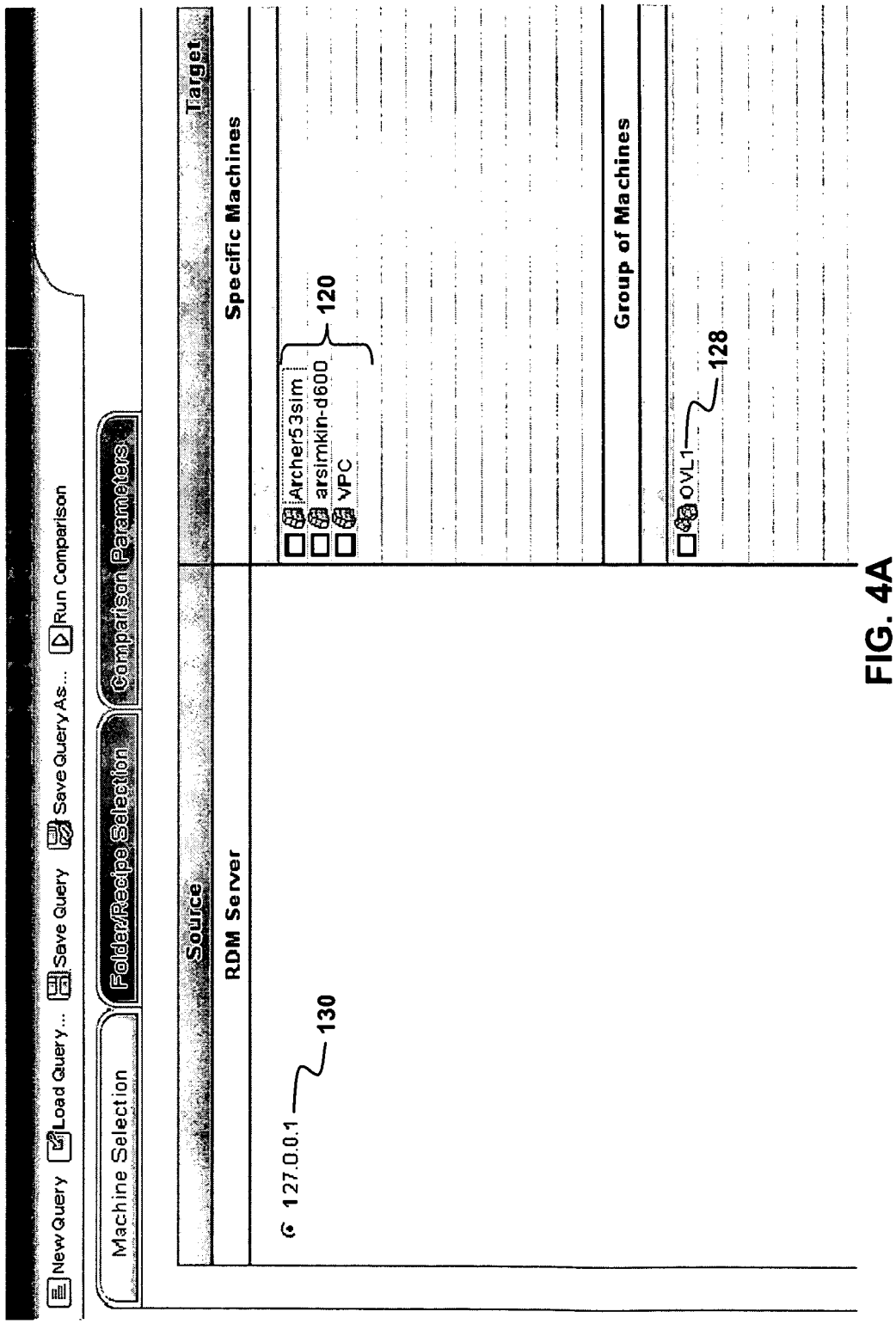
Figure 4B:
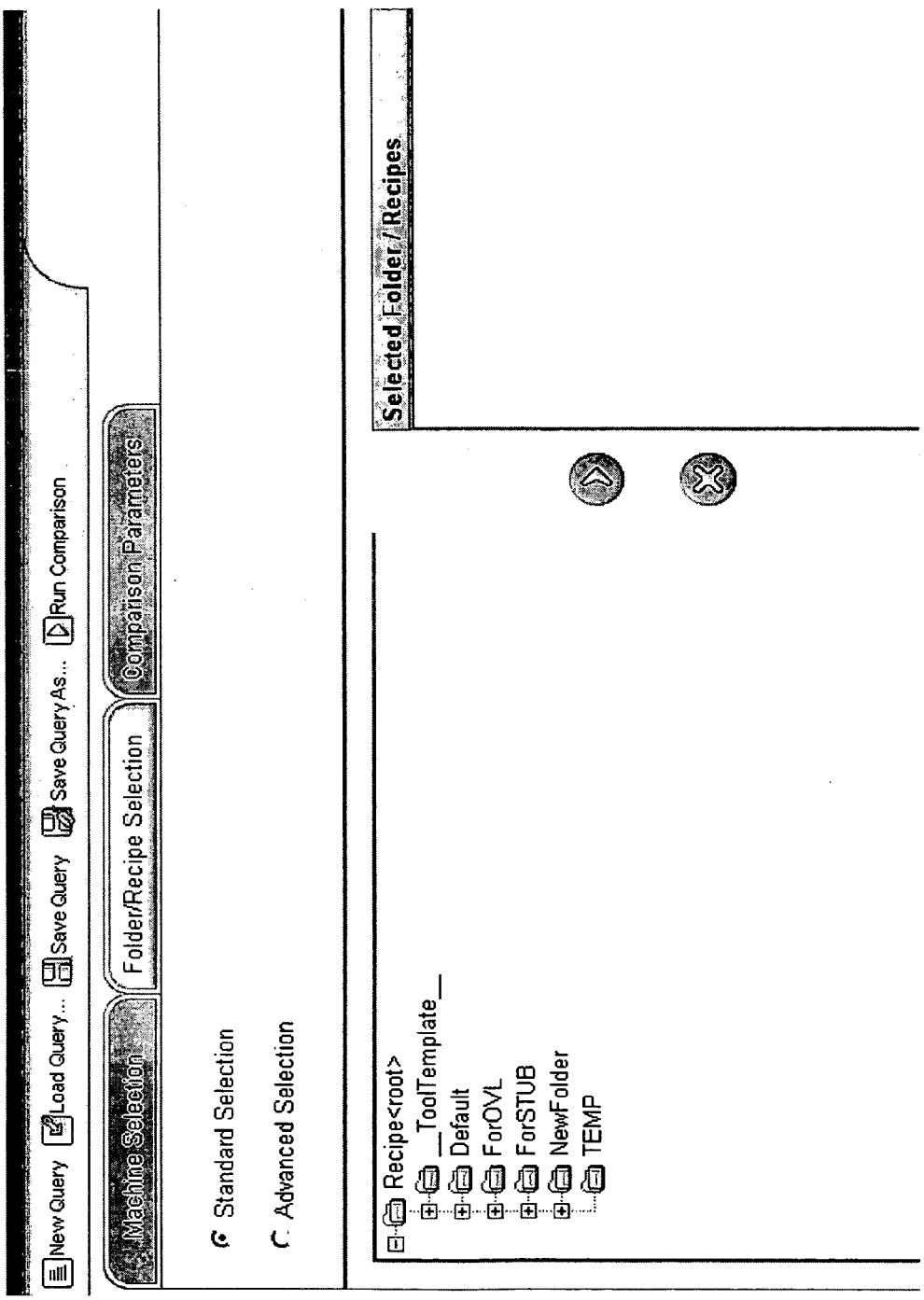

FIGS. 4A-4D illustrate screen shots produced by a recipe validation routine at various stages of a comparison of a source and target recipe. As shown in FIG. 4A a user may select the source and target device from a first screen. The user may be presented with options of creating a new query, loading an existing query, saving the current query and/or running a comparison. The user may click on a tab marked "Machine Selection" and is presented with a choice of source devices and target devices. In this example the choice of source devices is limited to the RDM server 130 and the targets are limited to specific tools 120. In some embodiments, the user may have the option of choosing a group 128 of machines as the target device. Once the source and/or target devices are selected, the user may click on a tab marked "Folder/Recipe Selection" to presented with a pull-down menu for selecting the source and or target recipes as shown in FIG. 4B.

Figure 4C:
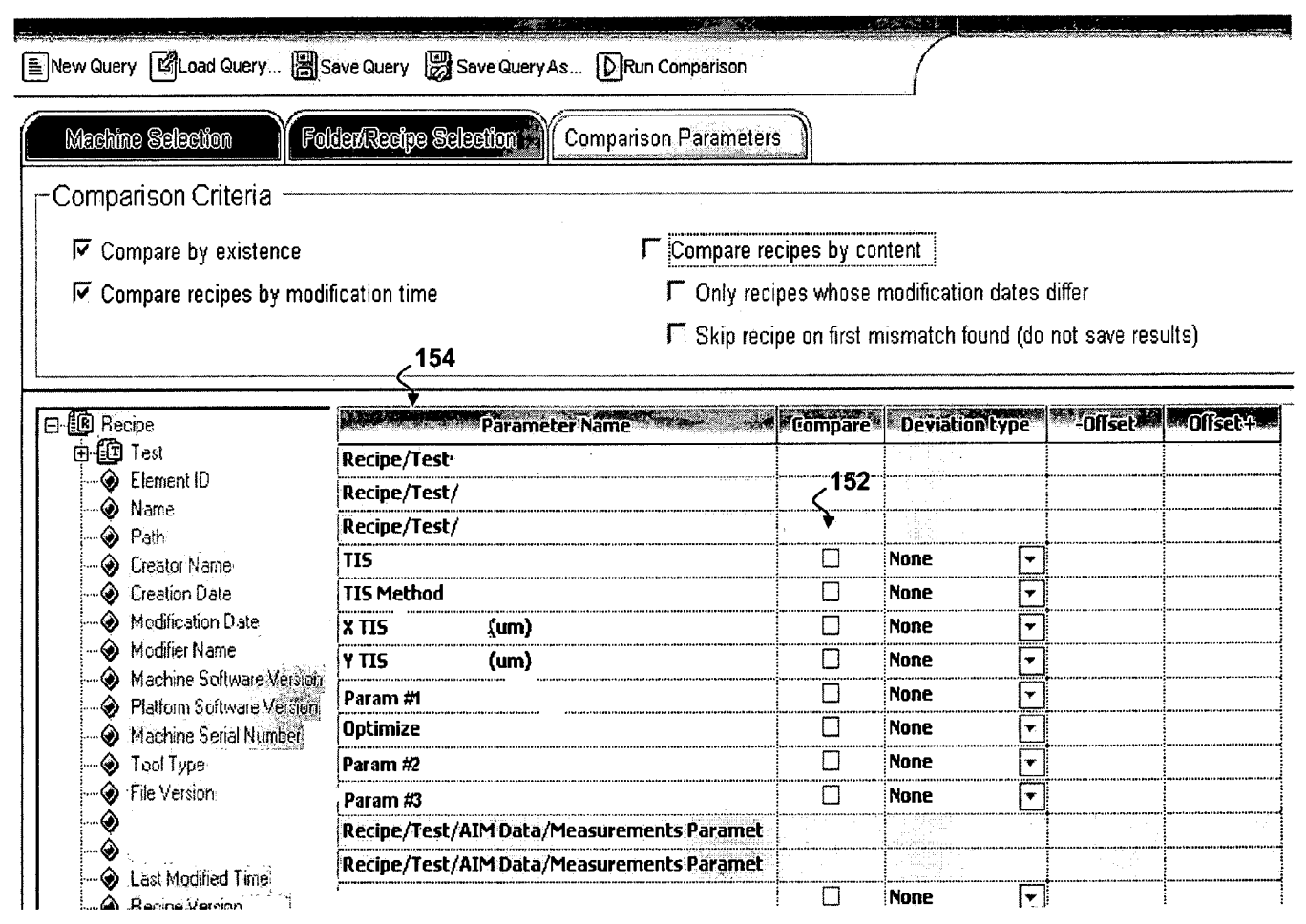

Once the source recipe has been selected comparison criteria may be selected. For example, as shown in FIG. 4C, by clicking on a "Comparison Parameters" tab, the user may select the comparison criteria and/or recipe parameters to be used in the comparison. In this example, the comparison criteria include check boxes for selecting comparison by existence, modification time or content. Under comparison by content a user may elect to compare only those recipes whose modification dates differ from the last modification date of the source recipe. The user may select, e.g., by clicking on one or more check boxes 152 which recipe parameters 154 to compare. In addition, the user may select from a pull-down menu a type of permissible deviation of the target recipe parameter value from the corresponding source recipe parameter value. Examples of deviation types include "None" and "Offset". If a user selects "Offset" positive and negative values for deviation from the source recipe parameter value. This option is suitable, e.g., where the parameter value being compared is a numerical value.

By clicking on "Run Comparison" the user may run the query. The comparison routine 126 may then produce results from the query and report them to the user. For example, as shown in FIG. 4D, the comparison routine may produce and display a report 160. In this example, the report 160 shows the source values and target values for the parameters compared and indicates under "Compare Result" whether the target value passed or failed the comparison to the source value.

Figure 5:
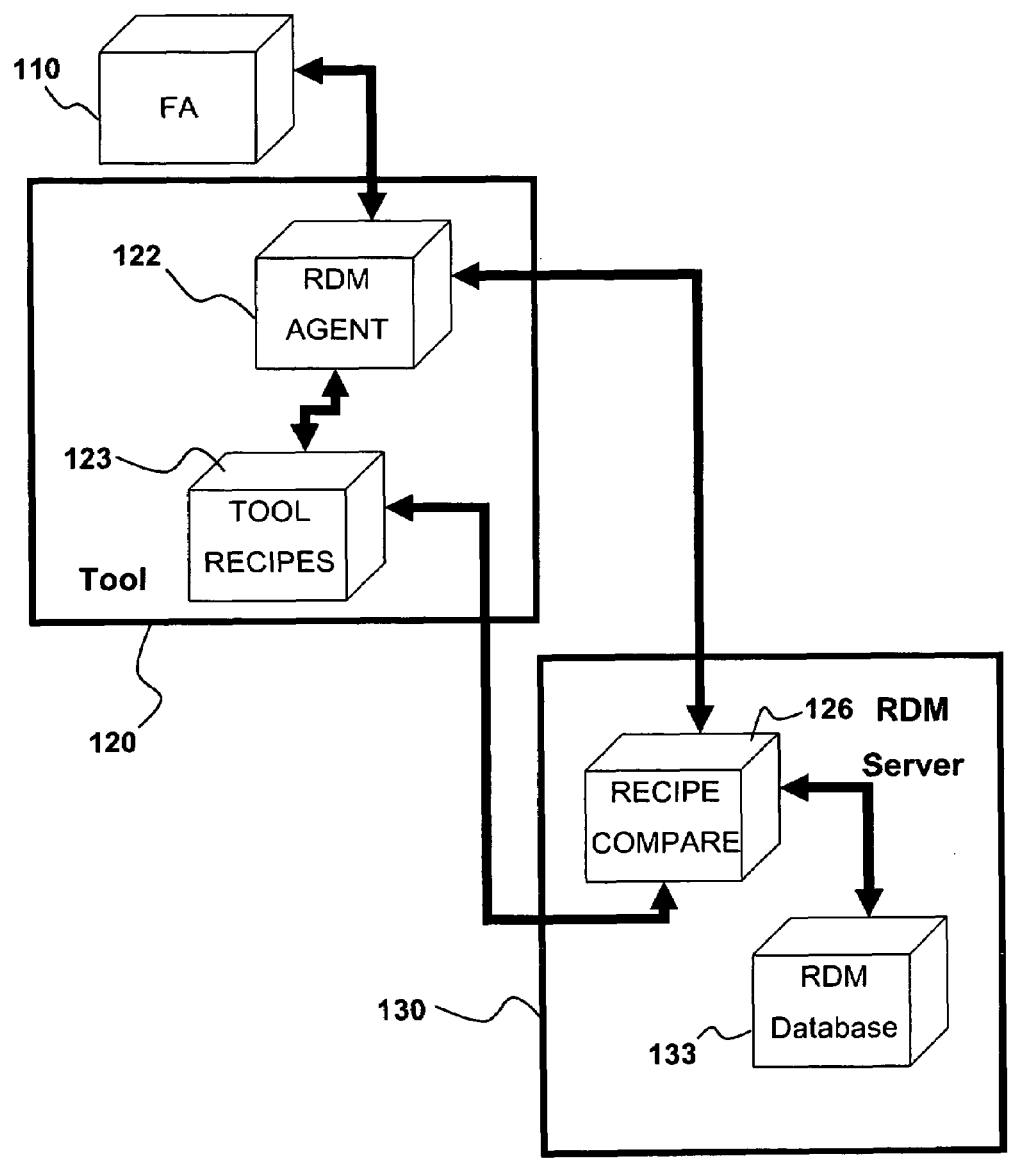
FIG. 5 is a schematic diagram illustrating an example of a pre-run recipe validation according to an embodiment of the present invention.

As discussed above, embodiments of the present invention allow for validation of tool recipes 123 before they are run. FIG. 5 depicts schematically an example of such a pre-run validation. The FA 110 sends a host initiated command to a tool 120. The RDM Agent 122 on the tool 120 translates the host initiated command to Compare settings.

The generated Compare settings are forwarded to the RDM server 130. Based on the Compare settings, the RDM server 130 fetches a tool recipe 123 and a corresponding standard recipe 135. The translation routine 124 in the RDM agent 122 translates the tool recipe 123 into a standard language format such as XML and the comparison routine 126 compares resulting translated recipe against the standard recipe 135. The results of the comparison are returned to the tool 120, which may run the tool recipe 123 if the comparison succeeds. Note that in this example, the recipe comparison routine 126 is part of the RDM software 136 running on the RDM server 130.

The recipe can be translated anywhere an RDM agent 122 resides. It is noted that RDM agent software is typically installed on the RDM server 130 and may also be installed on a tool. Where an RDM agent 122 is installed on the tool 120 then the recipe translation can be done on the tool without the RDM server involvement. The recipe compare routine 126 is preferably done on the RDM server 130, particularly if it's too heavy a program to run on the tool. It is noted that embodiments of the present invention do not preclude the possibility of running the recipe compare routine 126 on the tool.

Embodiments of the present invention also allow the FA 110 to include in the compare settings for the standard recipe itself or a standard template 114 (a partial recipe, containing only the parameters that are critical for a standard recipe) to be used for the compare. This will allows a user of the system 100 to have the set of standard settings on its host and not on the RDM server 130.

Figure 6:
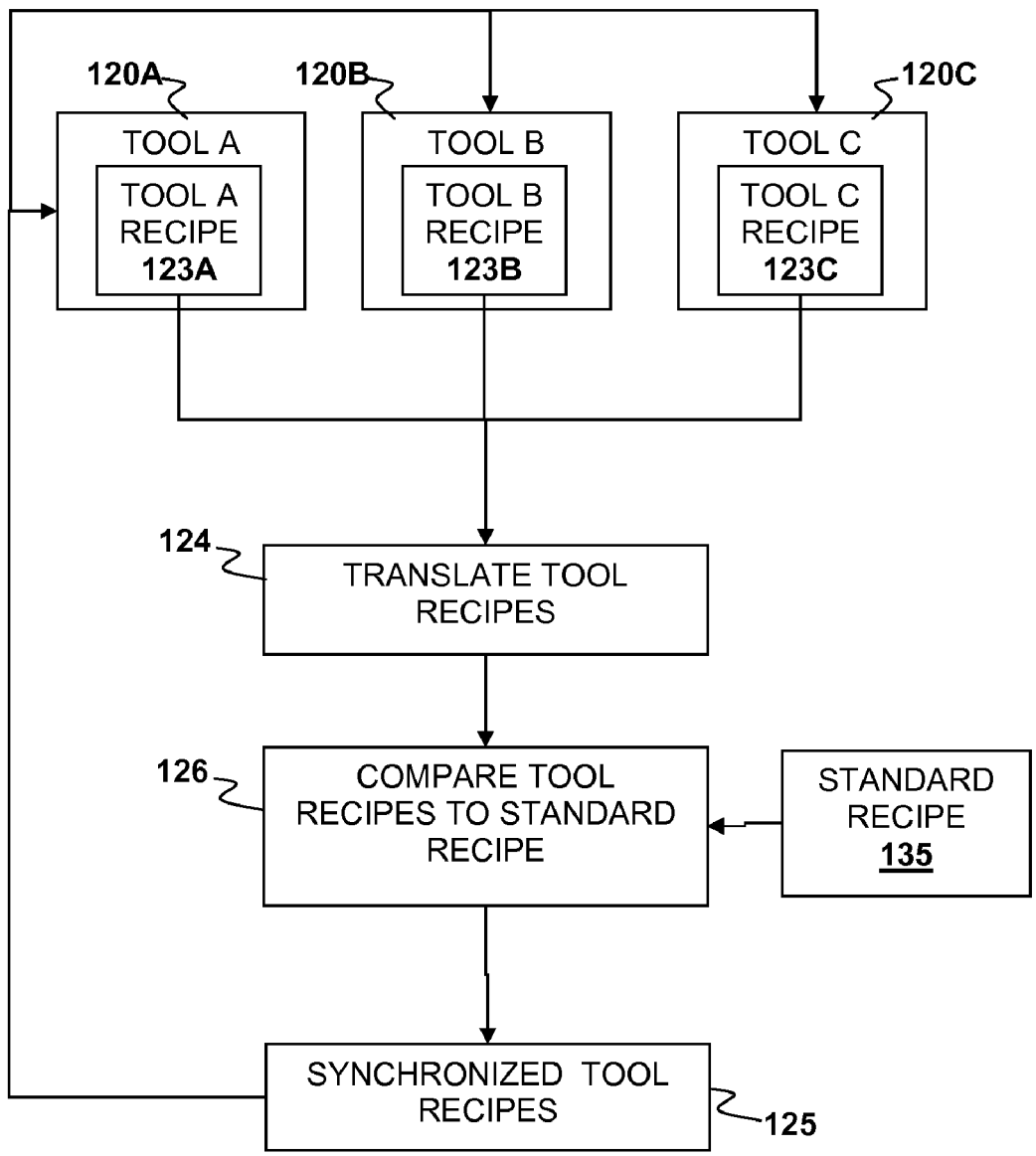
FIG. 6 is a schematic diagram illustrating an example of synchronization of multiple recipes according to an embodiment of the present invention.

Embodiments of the present invention also allow for comparison and synchronization of recipes for multiple tools. For example as shown in FIG. 6, recipes 123A, 123B, 123C from different tools 120A, 120B, 120C respectively may be translated by the translation routine 124 and compared against a common standard recipe 135, e.g., using the comparison routine 126 as described above. By way of example each of the tools 120A, 120B, 120C, may be of the same type, e.g., all may be overlay metrology tools or different types of tools of a common category, e.g., different types of metrology tools performing different parts of an overall recipe. It is possible to compare recipe parameters that are common to the different tools' recipes. For example recipes for different metrology tools may include parameters such as wafer map, die size or coordinates of alignment marks. One can do a partial recipe compare even between different tools provided their recipe can be translated to the standard language format, e.g., a markup language format such as XML, and the recipe has some common parameter that it makes sense to compare.

Once the recipes are compared, the different tools may be synchronized to the standard recipe. The tools may be synchronized to the standard recipe by overwriting "bad" or erroneous recipe parameters with the standard recipe parameters, thereby fixing any bad recipes. The resulting synchronized tool recipes 125 may then be sent back to the tools 120A, 120B, 120C to be run.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a system having one or more tools, a method for recipe comparison, the method comprising:
digitally translating a target recipe from a tool language to a standard language format to produce a translated recipe;
digitally comparing one or more portions of the translated recipe to a source recipe, wherein the source recipe is in the standard language format, and
reporting a result of comparing the one or more portions of the translated recipe to the source recipe.

2. The method of claim 1 wherein comparing the translated target recipe includes comparing one or more criteria in the translated recipe against one or more corresponding parameters in the source recipe.

3. The method of claim 2 wherein comparing the one or more criteria in the translated recipe includes determining whether a value of a parameter in the translated recipe is within a range of values defined in the source recipe.

4. The method of claim 2 wherein comparing the one or more criteria in the translated recipe includes determining whether a criteria in the translated recipe is equal to a value defined in the source recipe.

5. The method of claim 2 further comprising replacing, if required per user definition, an unacceptable parameter value in the translated recipe with a corresponding parameter from the standard recipe.

6. The method of claim 2 wherein comparing the one or more criteria in the translated recipe includes comparing one or more parameters in the translated recipe to corresponding parameters in a template recipe, wherein the template recipe contains a subset of possible recipe parameters for the translated recipe.

7. The method of claim 1 wherein digitally comparing one or more portions of the translated recipe to a source recipe includes determining if a recipe corresponding to the source recipe exists on a target tool.

8. The method of claim 1 wherein digitally comparing the translated recipe includes digitally comparing one or more lines of the translated recipe against one or more corresponding lines of the source recipe.

9. The method of claim 1, wherein digitally translating the target recipe and comparing the translated tool recipe take place automatically prior to an attempt to run the tool recipe on a tool.

10. The method of claim 1 wherein the target recipe is a tool recipe associated with a semiconductor processing tool and the source recipe is a standard recipe, wherein digitally comparing the translated recipe to a source recipe includes determining whether the translated recipe passes a comparison with the standard recipe.

11. The method of claim 10, further comprising a step of running the tool recipe on the tool if the tool recipe passes the comparison with the standard recipe.

12. The method of claim 10, further comprising a step of notifying a user if the translated recipe fails the comparison with the standard recipe.

13. The method of claim 10, further comprising a step of preventing the recipe from running automatically on the tool if the translated recipe fails the comparison with the standard recipe.

14. The method of claim 1 wherein the standard language format is a text format.

15. The method of claim 1 wherein the standard language format is a markup language.

16. The method of claim 15 wherein the markup language is XML, SGML or HTML.

17. The method of claim 1 wherein the one or more tools include one or more semiconductor processing tools.

18. The method of claim 17 wherein the one or more semiconductor processing tools include one or more metrology tools.

19. The method of claim 18 wherein the one or more metrology tools include an overlay tool, thin film tool, CD-SEM, wafer inspection tool, electron beam tool, or scatterometry tool.

20. The method of claim 1 wherein the one or more semiconductor processing tools include a deposition tool, etch tool, chemical mechanical polishing (CMP) tool, lithography tool, or stepper developer tool.

21. The method of claim 1 wherein the standard recipe or a standard recipe template is stored on a database management server coupled to the one or more tools or on a Fab Host coupled to the one or more tools.

22. The method of claim 21 wherein digitally translating the tool recipe includes the use of a translation code implemented on a database management client coupled to the tool and the database management server.

23. The method of claim 1, further comprising the step of retrieving the tool recipe from a tool before digitally translating the tool recipe.

24. The method of claim 23 wherein digitally comparing the translated tool recipe to the standard recipe includes determining a modification time of the tool recipe.

25. The method of claim 1 wherein digitally translating a target recipe includes digitally translating recipes from two or more tools from a tool language to a standard language format to produce two or more corresponding translated recipes; and wherein digitally comparing one or more portions of the translated recipe includes comparing one or more parameters from each of the two or more translated recipes to corresponding standard parameters in a standard recipe.

26. A recipe database management server, comprising
a processor;
a memory coupled to the processor;
a database stored within the memory, the database containing one or more standard tool recipes; and a set of coded instructions configured to execute on the processor a method for recipe comparison in a system having one or more tools coupled to the recipe database management server, the method comprising:
translating a tool recipe stored in a processing tool from a tool language to a standard language format to produce a translated tool recipe with a translator running on the database management server;
comparing the translated tool recipe to a standard recipe stored on the database management server in the standard language format.

27. A processor readable medium having embodied therein a set of processor readable instructions, the processor readable instructions, the instructions being configured to implement a method for recipe comparison in a system having one or more tools coupled to a recipe database management server, the method comprising:
translating a tool recipe stored a processing tool from a tool language to a standard language format to produce a translated tool recipe with a translator running on the database management server;
comparing the translated tool recipe to a standard recipe stored on the database management server in the standard language format.

* * * * *